United States Patent
Balachandran et al.

(10) Patent No.: US 6,173,663 B1
(45) Date of Patent: Jan. 16, 2001

(54) CARBON DIOXIDE REMEDIATION VIA OXYGEN-ENRICHED COMBUSTION USING DENSE CERAMIC MEMBRANES

(75) Inventors: Uthamalingam Balachandran, Hinsdale, IL (US); Arun C. Bose; Howard G. McIlvried, both of Pittsburgh, PA (US)

(73) Assignee: The University of Chicago, Chicago, IL (US)

( * ) Notice: Under 35 U.S.C. 154(b), the term of this patent shall be extended for 0 days.

(21) Appl. No.: 09/336,791

(22) Filed: Jun. 21, 1999

(51) Int. Cl.[7] .............................. F23D 1/00; F23J 15/00; C10C 5/00
(52) U.S. Cl. .................. 110/347; 110/344; 110/345; 44/620
(58) Field of Search ....................... 110/232, 342, 110/344, 345, 347, 218; 44/620, 607, 608, 591, 592, 593

(56) References Cited

U.S. PATENT DOCUMENTS

| | | | |
|---|---|---|---|
| 4,397,248 | * 8/1983 | Mehta et al. ........................ | 110/263 |
| 4,402,275 | * 9/1983 | Weiner et al. ...................... | 110/347 |
| 4,537,760 | * 8/1985 | Lavie et al. ........................ | 423/359 |
| 5,573,737 | * 11/1996 | Balachandran et al. ............. | 422/211 |
| 5,580,497 | * 12/1996 | Balachandran et al. ............. | 252/519 |
| 5,639,437 | * 6/1997 | Balachandran et al. ............. | 423/593 |
| 5,697,307 | * 12/1997 | Nelson et al. ...................... | 110/345 |
| 5,724,897 | * 3/1998 | Breen et al. ........................ | 110/261 |
| 5,906,806 | * 5/1999 | Clark .................................. | 423/437.1 |

* cited by examiner

*Primary Examiner*—Denise L. Ferensic
*Assistant Examiner*—K. B. Rinehart
(74) *Attorney, Agent, or Firm*—Emrich & Dithmar

(57) ABSTRACT

A method of combusting pulverized coal by mixing the pulverized coal and an oxidant gas to provide a pulverized coal-oxidant gas mixture and contacting the pulverized coal-oxidant gas mixture with a flame sufficiently hot to combust the mixture. An oxygen-containing gas is passed in contact with a dense ceramic membrane of metal oxide material having electron conductivity and oxygen ion conductivity that is gas-impervious until the oxygen concentration on one side of the membrane is not less than about 30% by volume. An oxidant gas with an oxygen concentration of not less than about 30% by volume and a $CO_2$ concentration of not less than about 30% by volume and pulverized coal is contacted with a flame sufficiently hot to combust the mixture to produce heat and a flue gas. One dense ceramic membrane disclosed is selected from the group consisting of materials having formulae $SrCo_{0.8}Fe_{0.2}O_x$, $SrCo_{0.5}FeO_x$ and $La_{0.2}Sr_{0.8}Co_{0.4}Fe_{0.6}O_x$.

5 Claims, 1 Drawing Sheet

Flow Chart
Pulverized coal combustion using a mixture of $O_2$ and $CO_2$

CARBON DIOXIDE REMEDIATION VIA OXYGEN-ENRICHED COMBUSTION USING DENSE CERAMIC MEMBRANES

CONTRACTUAL ORIGIN OF THE INVENTION

The United States Government has rights in this invention pursuant to Contract No. W-31-109-ENG38 between the U.S. Department of Energy and The University of Chicago representing Argonne National Laboratory.

TECHNICAL FIELD

This invention relates to a method for the reduction of anthropogenic carbon dioxide ($CO_2$) emissions by oxygen-enriched mode of combustion in coal-fired boilers using a mixture of oxygen, nitrogen, and carbon dioxide or, preferably, a mixture of oxygen and carbon dioxide as the combustion oxidant. This mode of combustion generates carbon dioxiderich flue gas that is easy to capture, concentrate, and remediate via chemical or biological utilization or ocean or geologic sequestration. Carbon dioxide is believed to cause global warming. The invention also relates to the production of nitrogen from air as a chemical feedstock for the production of ammonia.

BACKGROUND OF THE INVENTION

Coal-fired utility boilers for electricity generation is nearly a 70 year old commercially-accepted technology and is expected to continue for many years. However, it is imperative that we make it an environmentally-responsible technology. Since the Clean Air Act legislation in 1970, significant progress has been made by power generation industries to reduce emissions of NO, $SO_2$, and particulates. Attention is now focused on the mitigation of carbon dioxide emissions that is believed to cause global climate change. Energy Information Administration's International Energy Outlook estimates that nearly 2.5 billion metric tons of $CO_2$ are emitted due to coal use and is projected to grow to nearly 4 billion metric tons by 2020. The $CO_2$ emissions from coal use are primarily from electricity generating conventional coal-fired power plants that customarily use air as the oxidant.

There is currently no enabling technology for mitigating $CO_2$ emissions to our environment. Potential strategies include the capture of $CO_2$ emitted from coal-fired stationary combustion sources and either sequester it or use it as a feedstock for products of commerce. World-wide $CO_2$ emissions from all fossil burning sources amount to nearly 6 billion metric tons and is always emitted as dilute streams. Capturing the $CO_2$ from stationary combustion sources as dilute streams containing nearly 75% nitrogen, concentrating the $CO_2$, and then reacting it to make economically-attractive products of commerce is a formidable challenge. Ocean or geologic sequestration is not always viable for the simple reasons of transportability and logistics.

An alternative to the dilute stream capture and sequestration option is to design and/or modify power systems configuration to make such combustion systems inherently-low $CO_2$ emitting technologies. One such concept is to use a mixture of oxygen and carbon dioxide as the oxidant instead of air in stationary combustion processes. The result is a $CO_2$-enriched flue gas stream that contains no nitrogen and requires much smaller process equipment to capture, concentrate, and then sequester. The flue composition is primarily $CO_2$ and water. A portion of the flue gas may also be recycled following hot gas clean-up operation for NOx, and $SO_2$, and particulate removal. In addition, $O_2$—$CO_2$ combustion mode reduces furnace volume and therefore capital for new plants, reduces load to the flue gas desulfurization and $NO_x$ reduction units, requires lower power for auxiliary load draws for primary and secondary combustion fans, lowers duty to the Heat Recovery Steam Generator unit, and provides heat rate improvement and high flame temperature. This improves combustion efficiency, and the efficiency improvement translates into lower $CO_2$ emissions.

Oxygen derived by conventional cryogenic technology is not a viable option for oxygen-enriched combustion of coal-fired boilers. This is because cryogenic technology requires extremely low temperature (below −290° F.) where air becomes a liquid and oxygen is separated by distillation. A conventional power plant heats steam to over 1000° F. for driving a turbine. With the availability of high temperature heat exchanger material, future power plants would be operated at much higher temperatures. This level of temperature spread, cryogenic on one side and very high temperature required for coal combustion on the other side, is not acceptable to electricity producing industries. A technology that would use the power plant's heat sources to thermally energize an air separation process and would produce low-cost oxygen, would enhance the acceptance of combustion modification by the electric utility industry sector, especially to comply with voluntary or involuntary carbon emission regulations. Availability of low-cost oxygen would also make oxygen-blown Integrated Gasification Combined Cycle an economic power producing choice.

Ceramic membranes are being developed that will selectively separate oxygen from air at high temperature and pressure. These are solid electrolytes that allow ionization of oxygen on one surface followed by conduction of the oxygen anion to the other surface where molecular oxygen is reformed and released electrons are transported counter currently to ionize incoming oxygen molecules in the air. For example, U.S. Pat. Nos. 5,580,497, 5,639,437, and 5,573,737 (the disclosures of which are incorporated by reference) disclose oxygen anion and electron conducting ceramic membranes having requisite stability at several operation-regeneration process cycles. Generically these membranes can be represented by the formulae $ABO_3$ where appropriate substitution of the cations, A and B. creates ion vacancies that serve as pathways for the oxygen anions. The dense ceramic membranes disclosed in the '497, '437, and '737 patents provide the technology for oxygen-enriched combustion in coal-fired boilers as a mechanism for $CO_2$ remediation and handling.

The gas-impervious mixed metal oxide materials useful in ceramic membranes of this invention include any single phase and/or multi-phase, dense phase, intimate mixture of materials which together form a solid material having electron conductivity and oxygen ion conductivity. As used herein, the term "gas-impervious" means "substantially gas-impervious or gas-tight" in that the material does not permit a substantial amount of oxygen-containing gas stream or another, organic-containing, gas stream to pass through the solid mixed metal oxide materials of the ceramic membranes as a gas (i.e., the solid mixed metal oxide materials are non-porous, rather than porous, with respect to the relevant gases).

In particular, it has been found that mixed metal oxides having a perovskite structure (at operating temperatures) can have useful levels of oxygen ion conductivity. Materials known as "perovskites" are a class of materials which have an X-ray identifiable crystalline structure based upon the structure of the mineral perovskite, $CaTiO_3$. In its idealized form, the perovskite structure has a cubic lattice in which a unit cell contains metal ions at the corners of the cell, another metal ion in its center and oxygen ions at the midpoints of each cube edge. This cubic lattice is identified as an $ABO_3$-type structure where A and B represent metal ions.

In the idealized form of perovskite structures, generally, it is required that the sum of the valences of A ions and B ions equal 6, as in the model perovskite mineral, $CaTiO_3$. A relationship between radii of ions in an $ABO_3$-type structure containing two metal ions is expressed by the formula:

$$r_A + r_X = \tau \times (r_B + r_X) \times (2^{0.5})$$

where $r_A$, $r_B$, and $r_x$ are, respectively, radii of A ions, B ions and oxygen ions and $\tau$ is a factor having values in a range from about 0.7 to about 1.0. Typically, compounds with the perovskite structure have A ions with radii of between about 1.0 to about 1.4 Angstrom and B ions with radii of between about 0.45 to about 0.75 Angstrom. It appears, generally, that when mixed metal oxides of the perovskite structure contain A ions with radii approaching the low end of their range for a specific B ion as given by the formula above, then conductivity of oxygen ions generally increases. This trend toward increased conductivity of oxygen ions may be limited, however, by lowered stability of the perovskite structures at operating temperatures for A ions with radii approaching the low end of their range for a specific B ion.

A variety of selected chemical elements and compounds of selected elements, such as acetates, carbonates, chlorides, oxides, nitrates, etc., may be used to form perovskites useful in the present invention. Generally, any combination of metallic elements satisfying requirements of a perovskite may be used. Examples of useful chemical elements include beryllium (Be, Atomic No. 4), magnesium (Mg, Atomic No. 12), calcium (Ca, Atomic No. 20), scandium (Sc, Atomic No. 21), titanium (Ti, Atomic No. 22), vanadium (V, Atomic No. 23), chromium (Cr, Atomic No. 24), manganese (Mn, Atomic No. 25), iron (Fe, Atomic No. 26), cobalt (Co, Atomic No. 27), nickel (Ni, Atomic No. 28), copper (Cu, Atomic No. 29), zinc (Zn, Atomic No. 30), gallium (Ga, Atomic No. 31), strontium (Sr, Atomic No. 38), yttrium (Y, Atomic No. 39), zirconium (Zr, Atomic No. 40), niobium (Nb, Atomic No. 41), barium (Ba, Atomic No. 56), lanthanum (La, Atomic No. 57), cerium (Ce, Atomic No. 58), praseodymium (Pr, Atomic No. 59), neodymium (Nd, Atomic No. 60), promethium (Pm, Atomic No. 61), samarium (Sm, Atomic No. 62), europium (Eu, Atomic No. 63), gadolinium (Gd, Atomic No. 64), terbium (Tb, Atomic No. 65), dysprosium (Dy, Atomic No. 66), holmium (Ho, Atomic No. 67), erbium (Er, Atomic No. 68), thulium (Tm, Atomic No. 69), ytterbium (Yb, Atomic No. 70), lutetium (Lu, Atomic No. 71), and mixtures thereof.

Preferred A metal ions in the $ABO_3$-type structure materials useful in the present invention include ions of the lanthanide series of elements in the Periodic Table of Elements (Atomic Nos. 57 to 71 inclusive), yttrium ions (Atomic No. 39), and ions of the Group IIA elements in the Periodic Table of Elements, particularly magnesium ions (Atomic No. 12), calcium ions (Atomic No. 20), strontium ions (Atomic No. 38) and barium ions (Atomic No. 56).

Preferred B metal ions-in the $ABO_3$-type structure materials useful in the present invention include ions of the first row of transition elements in the Periodic Table of Elements, i.e., scandium ions (Atomic No. 21), titanium ions (Atomic No. 22), vanadium ions (Atomic No. 23), chromium ions (Atomic No. 24), manganese ions (Atomic No. 25), iron ions (Atomic No. 26), cobalt ions (Atomic No. 27), nickel ions (Atomic No. 28), copper ions (Atomic No. 29), and zinc ions (Atomic No. 30). Among these ions, cobalt ions and iron ions are more preferred.

A wide variety of multiple cation substitutions on both the A and B sites are stable in the perovskite structure. Likewise, a variety of more complex perovskite compounds containing a mixture of A metal ions and B metal ions are useful in this invention. Preferred for use in the present invention are materials having a perovskite structure containing metal ions of more than two elements (in addition to oxygen). Crystal structure of these mixed metal oxide compounds need not be pure perovskite it could be a mixed-crystalline phase material and perovskite could be one of those crystalline phases.

Examples of mixed metal oxides which are useful as solid oxygen ion-conductive ceramics in the present invention include lanthanum-strontium-cobaltite, lanthanum-calcium-cobalite, lanthanum-strontium-ferrie, strontium-ferrite, strontium-cobaltite, gadolinium-strontium-cobaltite, etc., and mixtures thereof. Specific examples included are $La_a Sr_b CoO_3$, $La_a Ca_b CoO_3$, $La_a Sr_b FeO_3$, $SrCo_a Fe_b O_3$, $Gd_a Sr_b CoO_3$, etc., were a and b are numbers, the sum of which is in a range from about 1 to about 1.5. Molar ratios between the respective metals represented by the ratio a:b may range widely, e.g., 4:1, 3:1, 1:1, 1:4, 1:3, etc. Particularly preferred are materials represented by $SrCo_{0.5}FeO_x$, $SrCo_{,0.8}Fe_{0.2}O_x$, and $La_{0.2}Sr_{0.8}Co_{0.4}Fe_{0.6}O_x$.

BRIEF SUMMARY OF THE INVENTION

The method relates to eniching the combustion air (oxidant) required for combustion of coal by increasing the oxygen concentration of the oxidant. Such enrichment can be accomplished by artificially creating oxidants composed of oxygen and nitrogen (ambient air contains typically 20.9% oxygen and the balance is essentially nitrogen with trace concentrations of inert gases and $CO_2$). However, the presence of the nitrogen allows thermal NOx formation. It is possible entirely to replace nitrogen by a $CO_2$ as the carrier gas. Therefore, an artificial mixture of oxidant can be made of oxygen, nitrogen, and carbon dioxide or oxygen and carbon dioxide. This invention entails the use of $O_2$—$CO_2$ as the oxidant where the $O_2$ is obtained on-site by separation by dense ceramic membranes and $CO_2$ is obtained from the combustion process itself. The dense ceramic membrane-based air separation makes the inventive combustion modification approach techno-economically attractive for $CO_2$ remediation.

In the inventive process, air is fed through the annular space of a concentric cylinder configuration where the inner tube is made of dense ceramic solid oxide electrolytic membrane, having the composition $ABO_3$ as set forth in the '497, '437, and '737 patents. As used herein, dense ceramic membranes refers to those materials disclosed in the '497, '437 and '737 patents which have perovskite structures that are substantially gas-impervious and conduct both electrons and oxygen-ions and which may be used to separate $O_2$ from other gases. Air is ionized on the outside surface of the inner tube, the oxygen ion is conducted through the wall to the inside surface of the inner tube. Ions are then relaxed, oxygen molecules are reformed, and flows out of the inner tube. Partial vacuum is maintained inside surface of the inner tube. The released electrons flow through the wall counter currently to ionize incoming oxygen molecules from air and thus maintain an oxygen-ion source. The pure oxygen is mixed with suitable diluents or carrier gases such as nitrogen and/or carbon dioxide, and fed to the combustion chamber. The $CO_2$-enriched flue gas is collected, cleaned, a portion saved for mixing with oxygen and the balance sequestered. The flue gas can also be partially recycled for mixing with the pure oxygen from the membrane unit after a hot gas clean-up operation.

Another object of the invention is the production of nitrogen from air using the dense ceramics disclosed herein.

The Haber process involves reaction of gaseous $H_2$ and $N_2$ over an Fe-based catalyst to produce $NH_3$ (ammonia) according to the following reaction:

$$N_2 + 3H_2 \rightarrow 2NH_3.$$

Ammonia is a key chemical produced at amounts on the order of $10^8$ metric tons per year. At the present time nitrogen for ammonia synthesis is produced by liquefying air and distilling nitrogen. The liquid nitrogen is vaporized to get gaseous nitrogen. The ceramic membrane we have developed removes oxygen from air. Ambient air contains essentially 20.9% $O_2$ and balance $N_2$ with trace concentrations of inerts and $CO_2$. We can use the ceramic membrane to increase the nitrogen content of air (to over 95%) by stripping $O_2$ from it. Since no more than 5% of oxygen is left in the oxygen-lean air exiting the annular section of the membrane, one can use pressure-swing absorption (PSA) or size-exclusion (molecular sieving) or adsorption-desorption (solubility based) type membranes for extracting the remaining small amount of oxygen from the oxygen-lean air and, thereby making pure nitrogen gas for ammonia synthesis.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
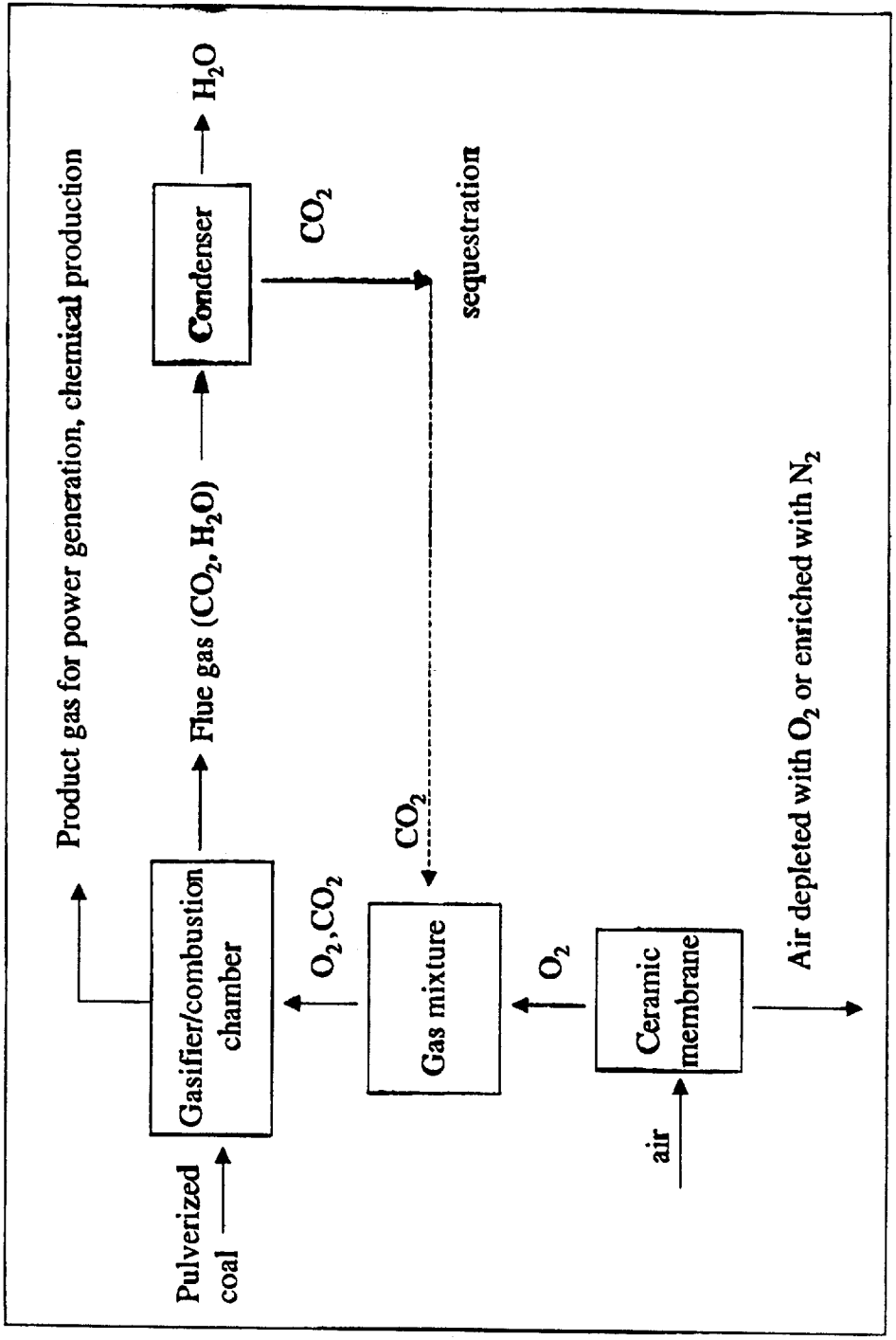
FIG. 1 is a flow chart illustrating the invention.

The present method relates to combusting coal in electric utility boilers using excess oxygen and using a portion of the flue gas as a diluent and thereby achieving a viable carbon dioxide emission reduction approach. Oxygen is separated by ceramic membrane unit at 750–900° C., the separated oxygen is mixed with nitrogen and/or carbon dioxide, and sent to the combustion chamber. The elevated temperature range is required to maintain the thermally-excited state of the oxygen anion and electron conducting membrane. The thermal excitation temperature can be maintained by heat exchange of the air to be separated with the flue gas exiting the combustion chamber. Part of this oxidant mixture is also used to transport pulverized coal to the combustion chamber. By pulverized coal, we mean coal 80% of which passes through a 200 mesh screen and having an average diameter of 75 microns. However, it is understood that the term "pulverized coal" is not meant to limit the invention, since coarser particulates can also be used in conventional boilers.

Baseline Case
Pulverized coal of the following composition:

| | |
|---|---|
| Carbon | 61.5% |
| Hydrogen | 4.2% |
| Oxygen | 6.0% |
| Ash | 22.0% |
| Sulfur | 5.1% |
| Nitrogen | 1.2% | is transported to the combustion chamber and burned using ambient air of typical composition of 21 volume % oxygen and 79 volume % nitrogen at a stoichiometric ratio of 1.0, meaning no excess air. The flue gas composition is 74.5 volume % nitrogen, 16.5 volume % $CO_2$, 8.4 volume % moisture, and other impurities make-up to 100 volume %. The theoretical adiabatic flame temperature is 3,764° F. Total flue gas produced is 930 lbs. per 100 lb. of dry, ash free coal.

Oxygen-Enriched Combustion Cases

Example no. 1: Pulverized coal of above composition is burned using a mixture of 30% oxygen and 70% carbon dioxide. The flue gas composition is 87.3% carbon dioxide and 11.7% water vapor. The adiabatic flame temperature is 3,752° F., very similar to the ambient air case. However, the flue gas is essentially a mixture of $CO_2$ and $H_2O$ with other trace contaminants and can be sequestered (following simple separation of water vapor by condensation) without the additional cost of nitrogen separation. Although the quantity of flue gas is not reduced (913 lb. per 100 lb. of dry ash free coal compared to the 930 lb. per 100 lb. of coal for the ambient air case), the temperature is comparable to the conventional case and thus today's coal-fired boilers can be retrofitted without any thermal impact on the existing material of construction. Use of the invention, therefore, eliminates the production of thermal $NO_x$ and produces a concentrated $CO_2$ stream that can be more easily collected and treated resulting in cleaner off gas.

Example no. 2: Pulverized coal of above composition is burned using a mixture of 40% oxygen, 30% nitrogen, and 30% carbon dioxide. The flue gas composition is 27% nitrogen, 56.7% $CO_2$, and 15.2% $H_2O$, the balance being trace constituents. The theoretical adiabatic flame temperature is increased to 5,481° F., meaning that less coal is required for a given power output. However, the flue gas contains nitrogen that has to be separated out before recycling or sequestration. The total quantity of flue gas produced is 615 lb. per 100 lbs. of dry, ash free coal.

Example no. 3: Pulverized coal of above composition is burned using a mixture of 50% oxygen and 50% carbon dioxide. The flue gas composition is 80.0% $CO_2$, and 18.6% $H_2O$, the balance being trace constituents. The adiabatic flame temperature is increased to 6,414° F., meaning that less coal is required for a given power output. The total quantity of flue gas produced is only 554 lb. per 100 lb. of dry, ash free coal. This means furnace size reduction and consequent lower capital for new plant. Additionally, the lower mass flow rate would mean much lower load to the flue gas desulfurization and the $NO_x$ reduction units. The flue gas is essentially $CO_2$ and $H_2O$ that can be partially recycled following hot gas clean-up operation, the rest sent for geologic or ocean sequestration without additional separation or cleaning. If the combustion system cannot be reconfigured for the flue gas recycle, then the flue gas consisting of primarily $CO_2$ and $H_2O$ can be easily captured, the water separated easily by condensation, part of the $CO_2$ used for mixing with oxidant for combustion, and the balance sequestered or used as a feedstock.

The theoretical adiabatic flame temperature for the 50:50 $O_2$—$CO_2$ run is high and the existing heat exchange materials for conventional boilers cannot withstand such high temperature. If, however, 50 or even 60 percent of the flue gas can be recycled, then the adiabatic flame temperature is in a reasonable range. However, for future power plants that will use high-temperature alloys, higher flame temperature can be tolerated to increase thermal efficiency to nearly 60%, especially for indirectly-fired combined cycle configurations.

Examples of Using Recycled Flue Gas for Combustion Cases

Example no. 1: Pulverized coal of above composition is burned using a mixture of 50% oxygen and 50% flue gas recycled from the 50:50 $O_2$—$CO_2$ run. The flue gas composition of the 50:50 $O_2$—$CO_2$ run is 80.0% $CO_2$ and 18.6% $H_2O$, the balance being trace constituents. Therefore, in this run the oxidant composition is 50% $O_2$, 40% $CO_2$, and 10% $H_2O$. The adiabatic flame temperature is 5,303° F., and therefore lower by over 1,000° F. compared to the 50:50 $O_2$—$CO_2$ run. The total quantity of flue gas produced is only 608 lb. per 100 lb. of dry, ash free coal. In addition to furnace size reduction and consequent lower capital for new plant, lower loads to the flue gas desulfurization and the $NO_x$ reduction units, this combustion modification reduces the flue gas volume by nearly 33% that needs to be handled for sequestration.

Example no. 2: Pulverized coal of above composition is burned using a mixture of 40% oxygen and 60% flue gas recycled from the 50:50 $O_2$—$CO_2$ run. The flue gas composition of the 50:50 $O_2$—$CO_2$ run is 80.0% $CO_2$ and 18.6% $H_2O$, the balance being trace constituents. Therefore, in this run the oxidant composition is 42% $O_2$, 48% $CO_2$, and 10% $H_2O$. The adiabatic flame temperature is 4,463° F., and therefore lower by nearly 2,000° F. compared to the 50:50 $O_2$—$CO_2$ run and quite close to the adiabatic flame temperature of 3,764° F. for the conventional air-blown operation. The total quantity of flue gas produced is only 724 lb. per 100 lb. of dry, ash free coal. However, this combustion modification reduces the flue gas volume by nearly 25% that needs to be handled for sequestration in addition to furnace size reduction and consequent lower capital for new plant and lower loads to the flue gas desulfurization and the $NO_x$ reduction units.

Referring now to FIG. 1 of the drawings, there is shown a flow chart illustrating the above-enumerated examples. More particularly, pulverized coal is admitted to a gas fire/combustion chamber into which is also introduced an oxidant gas of a combination of oxygen and carbon dioxide in the concentration ranges heretofore specified. From the gasifier/combustion chamber, a product gas for power generation or for chemical production is produced and a flue gas containing $CO_2$ and $H_2O$ is also produced. That flue gas is transmitted to a condenser which condenses water from the flue gas and returns carbon dioxide to the gas introduced to the gasified combustion chamber as an oxidant gas. The oxidant gas of enriched oxygen and carbon dioxide with or without water vapor is obtained by mixing carbon dioxide from the condenser along with oxygen produced from air, for instance, by the ceramic membranes disclosed herein. Air depleted in oxygen or enriched with nitrogen is the by-product of contact between the air and the ceramic membrane.

While there has been disclosed what is considered to be the preferred embodiment of the present invention, it is understood that various changes in the details may be made without departing from the spirit, or sacrificing any of the advantages of the present invention.

What is claimed is:

1. A method of combusting pulverized coal by mixing the pulverized coal and an oxidant gas to provide a pulverized coal-oxidant gas mixture and contacting the pulverized coal-oxidant gas mixture with a flame sufficiently hot to combust the mixture, comprising passing an oxygen-containing gas in contact with a dense ceramic membrane of metal oxide material having electron conductivity and oxygen ion conductivity that is gas-impervious until the oxygen concentration on one side of the membrane is greater than about 30% by volume, combining the gas having an oxygen concentration of greater than about 30% by volume with $CO_2$ to provide an oxidant gas having an oxyen concentration of not less than about 30% by volume and a $CO_2$ concentration of greater than about 30% by volume, providing a mixture of the oxidant gas and pulverized coal in contact with a flame sufficiently hot to combust the mixture to produce heat and a flue gas.

2. The method of claim 1, wherein said dense ceramic membrane is selected from the group consisting of materials having formulae $SrCo_{0.8}Fe_{0.2}O_x$, $SrCo_{0.5}FeO_x$ and $La_{0.2}Sr_{0.8}Co_{0.4}Fe_{0.6}O_x$.

3. The method of claim 1, wherein said dense ceramic membrane includes oxides selected from a first group of elements having atomic numbers 12, 20, 38, 39, and 56 to 71, inclusive, and selected from a second group of elements having atomic numbers 21 to 30.

4. The method of claim 1, wherein the coal-gas mixture is combusted to produce a flue gas containing carbon dioxide in a concentration in excess of about 50% by volume, and recycling a portion of the flue gas thus obtained to the oxidant gas.

5. The method of claim 1, wherein the coal-gas mixture is combusted to produce a flue gas containing carbon dioxide in a concentration in excess of about 50% by volume, and recycling a portion of the flue gas thus obtained to the oxidant gas, and further wherein said dense ceramic membrane includes oxides selected from a first group of elements having atomic numbers 12, 20, 38, 39, and 56 to 71, inclusive.

* * * * *